United States Patent Office 3,729,506
Patented Apr. 24, 1973

3,729,506
PRODUCTION OF 2,2-DIMETHYL-1,3-PROPANE-
DIOLHYDROXYPIVALIC MONOESTER
Franz Merger and Werner Fuchs, Ludwigshafen, Gerd Duembgen, Dannstadt, and Joachim Oberhansberg, Ludwigshafen, Germany, assignors to Badische Anilin- & Soda-Fabrik Aktiengesellschaft, Ludwigshafen am Rhine, Germany
No Drawing. Filed Nov. 16, 1970, Ser. No. 90,090
Claims priority, application Germany, Nov. 21, 1969, P 19 58 463.5; Jan. 8, 1970, P 20 00 699.9
Int. Cl. C07c 69/66
U.S. Cl. 260—484 R  9 Claims

ABSTRACT OF THE DISCLOSURE

The production of 2,2-dimethyl-1,3-propanediolhydroxypivalic monoester by heating 2,2-dimethyl-3-hydroxypropanal (prepared by the reaction of formaldehyde with isobutyraldehyde in the presence of tertiary amines) in the presence of an organic salt of a tertiary amine. As compared with the prior art methods, the process according to the invention gives 2,2-dimethyl-1,3-propanediolhydroxypivalic monoester by a simpler and more economical method, in higher purity and with a higher yield with reference to the starting material and with a higher space-time yield of pure end product. The compound which can be prepared by the process according to the invention is a more valuable starting material for the production of synthetic resins and plasticizers.

---

The invention relates to a process for the production of 2,2-dimethyl-1,3-propanediolhydroxypivalic monoester by heating 2,2-dimethyl-3-hydroxypropanal (obtained by reaction of formaldehyde with isobutyraldehyde in the presence of tertiary amines) in the presence of an organic salt of a tertiary amine.

It is known that 2,2-dimethyl-3-hydroxypropanal can be prepared by reaction of formaldehyde with isobutyraldehyde at 60° C. in the presence of potassium carbonate, 2,2-dimethyl - 1,3 - propanediolhydroxypivalic monoester being formed as a byproduct by the Tishchenko reaction (H. J. Hagemeyer, "The Chemistry of Isobutyraldehyde and its Derivatives," Tennessee Eastman Co., Kingsport, Tenn., 1931, page 17). It is also known that 2,2-dimethyl-3-hydroxypropanal can be prepared by reaction of the said starting aldehydes in the presence of strongly basic ion exchangers in the carbonate form (German printed application No. 1,235,883). The space-time yields are unsatisfactory due to the long residence times of the reaction mixture in the exchanger.

It is known that 2,2-dimethyl-3-hydroxypropanal is disproportionated in the presence of ethylmagnesium iodide (Monatshefte für Chemie, volume 25, page 865 et seq. (1904)) to form 2,2-dimethyl-1,3-propanediolhydroxypivalic monoester.

It is also known that 2,2-dimethyl-3-hydroxypropanal is a highly reactive compound and has the tendency at elevated temperature to disproportionate by the Tishchenko reaction (even in the absence of the conventional Tishchenko catalysts) with the formation of 2,2-dimethyl - 1,3 - propanediolhydroxypivalic monoester (Hagemeyer/De Croes, "The Chemistry of Isobutyraldehyde," Tennessee Eastman Company, 1953, page 17; U.S. Pat. No. 2,895,996, page 1, lines 25 to 40). A method for the production of 2,2-dimethyl-1,3-propanediolhydroxypivalic monoester by disproportionation of 2,2-dimethyl - 3 - hydroxypropanal at elevated temperature without any catalyst is based on this (U.S. Pat. No. 3,057,911; German Pat. No. 1,168,411).

A process which is as simple as possible, which has relatively short reaction periods, good yields and high purity of the end product is of particular importance for the production and use of 2,2-dimethyl-1,3-propanediolhydroxypivalic monoester on an industrial scale. The said methods are unsatisfactory in this respect. According to German Pat. No. 1,168,411, the crude starting material which still contains potassium carbonate (column 1, lines 43 to 49) is reacted for sixty hours or eighteen days. The specification discloses in Example 2 that the starting material is purified by distillation and recrystallization and then reacted for thirty hours. The end product, as disclosed in Example 3, has to be repeatedly recrystallized from a solution of acetone in heptane for purification, but decomposes at the boiling point in spite of the purification operations. An article in J. Org. Chem., 25, 2230 (1960) describes the very elaborate purification of the end product which is necessary and refers to the removal of potassium carbonate and other salts by a careful washing of the reaction mixture obtained in the production of 2,2-dimethyl-3-hydroxypropanal. The detrimental influence of salts in the production of the monoester is indirectly suggested in German Pat. No. 1,168,411 by the observation that the crude starting material is suitable for the reaction after the aqueous layer has been separated (column 3, lines 10 to 13).

It is known from Belgian Pat. No. 719,812 that 2,2-dimethyl-1,3-propanediolhydroxypivalic monoester can be prepared by disproportionation of 2,2-dimethyl-3-hydroxypropanal in the presence of alkaline earth metal hydroxides. In this case also it is 2,2-dimethyl-3-hydroxypropanal which is used as starting material and not its synthesis mixture, and the basic catalyst is separated prior to isolation of the end product.

The object of this invention is a new process for producing 2,2-dimethyl-1,3-propanediolhydroxypivalic monoester in higher purity and (in relation to the starting material) a higher yield and a higher space-time yield.

We have found that 2,2-dimethyl-1,3-propanediolhydroxypivalic monoester is advantageously obtained at elevated temperature from 2,2-dimethyl-3-hydroxypropanal prepared by reaction of formaldehyde with isobutyraldehyde at elevated temperature in the presence of tertiary amines when the reaction mixture obtained by reaction of formaldehyde with isobutyraldehyde, after free tertiary amine has been separated, is reacted in the presence of an organic salt of a tertiary amine having a molecular weight of less than 250 at a temperature of from 120° to 175° C.

The process advantageously includes stripping of the reaction mixture during the reaction with an inert gas and/or the vapor of a solvent which is inert under the reaction conditions.

The reaction may be represented by the following formulae:

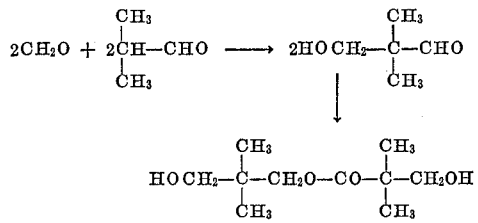

As compared with prior art methods, the process according to the invention gives 2,2-dimethyl-1,3-propanediolhydroxypivalic monoester in a simpler and more economical way in better purity and, in relation to the starting materials, in higher yields and higher space-time yields of pure end product. Having regard to the prior art it is surprising that instead of purified starting material the crude mixture may be used without detriment to the yield of end product and that the presence of a salt in the form of an organic salt of a tertiary amine favorably affects the reaction of the 2,2-dimethyl-3-hydroxypropanal and does not hinder the isolation of the end product. The pure end product has a definite boiling point without decomposition and may be used immediately for syntheses requiring particularly pure starting materials, for example for the production of colorless polyesters in the plastics industry.

The mixture from the reaction of formaldehyde with isobutyraldehyde at elevated temperature in the presence of tertiary amines used as starting material generally contains (after removal of water and free amine) in addition to 2,2-dimethyl-3-hydroxypropanal, from 1 to 6% by weight of end product already formed, from 0 to 4% by weight of aldoxanes from 2,2-dimethyl - 3 - hydroxypropanal and isobutyraldehyde and formaldehyde and from 0.05 to 20, as a rule from 0.08 to 0.25% molar of formate of the tertiary amine and also from 0.5 to 1.5% by weight of unreacted starting aldehydes, with reference to the reaction mixture.

In a preferred embodiment, the reaction mixture from the appropriate reaction with a molar ratio of 0.5 to 1.5, preferably 0.9 to 1.1, moles of formaldehyde to 1 mole of isobutyraldehyde described in German patent application P 17 93 512.5 is used. Formaldehyde is used as a rule in the form of an aqueous, for example 37% by weight, Formalin solution, which may if desired be stabilized with methanol. The reaction is carried out as a rule at a temperature of from 20° to 100° C., preferably from 60° to 95° C., continuously or batchwise. Although subatmospheric or superatmospheric pressure may be used, the reaction at atmospheric pressure is the preferred embodiment. Water alone is generally used as solvent, the amount of water introduced by the Formalin solution being adequate in most cases. The amount of water is conveniently from 15 to 50% by weight based on the reaction mixture.

The reaction between formaldehyde and isobutyraldehyde is carried out in the presence of a tertiary amine having a molecular weight of less than 250, as a rule in an amount of from 0.5 to 25%, advantageously from 2 to 10%, molar with reference to isobutyraldehyde. Amines having a basicity constant of at least $10^{-6}$ are preferred. Cycloaliphatic, araliphatic, aromatic, heterocyclic and particularly aliphatic tertiary amines are suitable for the process and the nitrogen atom may bear identical or different substituents. As a rule only amines whose acetates or formates have a lower boiling point than 2,2 - dimethyl - 1,3 - propanediolhydroproxypivalic monoester are used, for example triethylamine (boiling point of formate 90° C. at 10 mm.) or trimethylamine (boiling point of formate 86° C. at 17 mm.). Examples of suitable amines are triethylamine, methyldiethylamine, methyldiisopropylamine, tributylamine, dimethyl - tert-butylamine, N,N' - tetramethylethylenediamine, cyclohexyldimethylamine, tribenzylamine, N - methylpiperidine, N,N'-dimethylpiperazine, N-methylmorpholine and triethanolamine. The reaction period is as a rule from three minutes to three hours, advantageously from ten to thirty minutes.

The free tertiary amine and as a rule also the water is removed by a conventional method (for example by distillation at temperatures of up to 80° C. and under a subatmospheric pressure of from 30 to 140 mm.) from the reaction mixture (aldolization) obtained in this way. Although it is possible to carry out the reaction of 2,2-dimethyl-3-hydroxypropanal to 2,2 - dimethyl-1,3-propanediolhydroxypivalic monoester in the presence of the free amine, the formation of byproducts, particularly 2,2-dimethylpropanediol-(1,3) and 2-(hydroxy-tert-butyl)-5,5-dimethyl-1,3-dioxane, is increased and the yield of end product correspondingly decreased. The free amine obtained, which may form a two-phase distillate with water and small amounts of isobutyraldehyde and 2,2-dimethyl-3-hydroxypropanal, may be separated and reused. In the preferred embodiment, recovery of amine from the distillate is completed to the extent of 92 to 96% of the amount used by distilling off the aqueous phase at a pH value of 12 to 13. The remaining 4 to 8% of amine is present as formate and may be recovered quantitatively during isolation of the end product.

After the amine has been separated, the starting mixture is reacted in the presence of an organic salt of a tertiary amine having a molecular weight less than 250 at a temperature of from 120° to 175° C., preferably from 140° to 165° C. The reaction period is as a rule from 1½ to 20 hours, preferably from 2 to 3½ hours. The reaction may be carried out at superatmospheric pressure or conveniently at atmospheric pressure, batchwise or continuously. The preferred amine salt is the formate of the amine in question which is formed in the production of the 2,2-dimethyl-3-hydroxypropanal, which remains in the reaction mixture after the free amine has been separated and thus acts as catalyst in the reaction of 2,2-dimethyl-3-hydroxypropanal. Further amounts of tertiary ammonium formate or another organic tertiary ammonium salt, for example an acetate, may also be added to the reaction mixture, but the limits of preferably from 0.08 to 0.25% molar (with reference to 2,2-dimethyl-3-hydroxypropanal) set by the production of the starting material are particularly advantageous for the reaction and working up.

When the reaction is carried out without appreciable amounts of water and at a temperature of from 120° to 160°, an acceleration of the reaction may be achieved by adding 0.1 to 1.5% molar of aluminum neopentyl glycolate.

After the reaction, the end product is separated by fractional distillation at subatmospheric pressure, without the conventional previous separation of the salt. Pressures of less than 50 mm., preferably less than 25 mm., are used for the purpose.

The continuous process may be carried out as follows:

Isobutyraldehyde and formaldehyde with 10% molar of triethylamine are reacted in a cascade of two stirred containers having mean residence times of five to fifteen minutes at from 90° to 95° C. with a continuous supply of isobutyraldehyde, 30% aqueous formaldehyde solution and triethylamine in a ratio by weight of 288:400:40 to form 2,2-dimethyl-3-hydroxypropanal. Water and triethylamine are continuously distilled off from the mixture in a column. The substantially dehydrated reaction mixture is transferred to a cascade of two reactors for rearrangement at 160° C. with mean residence times of three hours in each case.

The crude product is continuously fractionated in a column at pressures of 6 to 10 mm. (at the top of the column and of about 20 mm. (at the bottom)) and a maximum bottoms temperature of 185° C. Equivalent methods which are only partly continuous are also possible.

An advantageous embodiment of the process is based on the observation that the incidence of byproducts, for example isobutyraldehyde, formaldehyde, 2,2-dimethylpropanediol-(1,3) and esters of the same, and acetals, in the reaction mixture is lower and the yield of end product and reusable unreacted starting material is higher when inert gas and/or vapor which is inert under the conditions of the reaction is passed through the reaction mixtures during the reaction. By the removal of isobutyraldehyde and formaldehyde, undesirable Tishchenko reactions with 2,2-dimethyl-3-hydroxypropanal which result in neopentyl glycol esters of formic acid or of isobutyric acid are suppressed. The gas and vapor extract byproducts and/or impurities from the reaction mixture and these can be isolated in a conventional way by condensation and fractional distillation. The gas and vapor thus serve as assistants in purification of the reaction mixture. The said method is herein referred to as stripping in analogy with a definition in "Introduction to Chemical Engineering" by W. L. Badger and J. T. Banchero (McGraw-Hill Book Company Inc., 1955), page 437, final paragraph.

The inert gas and/or vapor is used as a rule in an amount of from 10 to 300% molar, preferably from 40 to 150% molar, with reference to 1 mole of 2,2-dimethyl-3-hydroxypropanal in the reaction mixture. Suitable solvents are those whose boiling points are below 175° C., preferably below 150° C. and particularly from 30° to 135° C. Examples of inert gases are rare gas such as argon and helium, ethane, methane, propane and preferably nitrogen and carbon dioxide. Vapor of the following organic solvents is for example suitable provided their boiling point is lower than 175° C.; aromatic hydrocarbons such as benzene, ethylbenzene, toluene or xylenes; aliphatic and cycloaliphatic hydrocarbons such as petroleum ether, hexane, methylcyclohexane, octane, cyclopentane, and cyclohexane; cyclic ethers such as dioxane, and tetrahydrofuran; chlorohydrocarbons such as chloroform, carbon tetrachloride, methylene chloride, 1,2-dichloroethane, and chlorobenzene; nitriles such as acetonitrile or propanoic nitrile; aliphatic ethers such as 1,1-dimethoxyethane, ethyl propyl ether, diisopropyl ether, nitromethane or nitroethane; or mixtures of these substances. Water is a preferred solvent and altogether a preferred assistant in the stripping. The use of water is least expensive because the extracted substances when mixed with water can be condensed more easily then when mixed with gases or organic solvents, and moreover organic solvents have to be returned for reasons of economy and prior to return have to be distilled to separate the extracted substances.

In other respects this advantageous variant of the process is carried out under the above-mentioned conditions of the process according to the invention. It is preferred to react isobutyraldehyde and formaledhyde to form 2,2-dimethyl-3-hydroxypropanal, to distill off the free amine together with water and to heat the mixture at from 140° to 165° C.; residual water and volatiles are thus distilled off, conveniently over a packed column. Then the steam or other assistant mentioned above is passed through the mixture, for example through a fritted glass disk, advantageously at the rate of 0.1 to 0.75 mole of assistant per mole of 2,2-dimethyl-3-hydroxypropanal (calculated on a theoretical 100% yield of the aldolization reaction) per hour. As a rule the assistant is used with stirring of the mixture and simultaneous rectification of the vapor (gas) extract, for example in an attached packed column. In this way entrained starting material is returned from the column into the reaction mixture. Instead of the vapor, the appropriate solvent may advantageously be supplied in liquid form (for example water) to the reaction mixture and the process according to the invention is accordingly carried out with the vapor forming at the reaction temperature in the mixture.

The distillate isolated with or from the assistant generally contains (besides the assistant) from 1 to 3% by weight of the triethylamine used and from 1 to 4% by weight of the isobutyraldehyde and formaldehyde used, which under the influence of the triethylamine reacts afresh to form 2,2-dimethyl-3-hydroxypropanal, and also small amounts of neopentylglycol and its monoesters with isobutyric acid and formic acid. The distillate can be processed by fractional distillation, but it is advantageous to unite it with the distillate from the separation of free triethylamine and from the two-phase mixture thus formed to return the organic phase direct into the starting mixture (aldolization) of a following batch. The aqueous phase, which contains only from 1 to 2% of the theoretical amount of 2,2-dimethyl-3-hydroxypropanal, may be discarded, if desired after quantitative separation of triethylamine by distillation.

The compound which can be prepared by the process according to the invention is a valuable starting material for the production of synthetic resins and plasticizers. It may also be used for syntheses in which special claims are made on the purity of the starting material, for example for the production of polyesters with dicarboxylic esters. By condensation with maleic anhydride, unsaturated polyesters are obtained having iodine color numbers (DIN 6162) of less than 1 and APHA color numbers (ASTM 1209) within the range from 10 to 60. As regards the use of the compound, reference is made to the said patents.

The following examples illustrate the invention. The parts specified in the examples are parts by weight.

EXAMPLE 1

A mixture of 975 parts of a 37% aqueous formaldehyde solution and 865 parts of isobutyraldehyde is heated to 50° under nitrogen. 120 parts of triethylamine is allowed to flow in during five minutes with vigorous stirring and reflux cooling and the temperature is raised to 92° to 94° C. within the next ten minutes. Triethylamine and water are then distilled off within fifteen to twenty minutes at 150 to 30 mm. and a maximum bottoms, temperature of from 70° to 75° C. through a column packed with Raschig rings into an ice-cooled receiver followed by a carbon dioxide cooling system. The remaining mixture is then heated within fifteen minutes at atmospheric pressure to 160° C., so that mainly water passes over, and stirred for another 160 minutes at this temperature. The mixture contains 0.2% by weight of triethylamine in the form of the formate. The mixture is fractionated over a column containing glass packing. Within the range of boiling points from 80° to 95° C. at 10 mm. 173 parts of a fraction is obtained which contains 116 parts of 2,2-dimethyl-3-hydroxypropanal, and at from 129° to 131° C. and 2 mm., 842 parts of 2,2-dimethyl-1,3-propanediolhydroxypivalic monoester (melting point 50° to 51° C.), equivalent to 68.7% of the theory with reference to each of the starting aldehydes used.

The two-phase water/triethylamine distillate (817 parts, of which 160 parts is organic phase) contains according to quantitative determination (gas chromatography) and fractional distillation: 19 parts of isobutyraldehyde and 72 parts of 2,2-dimethyl-3-hydroxpropanal (of which 16 parts of isobutyraldhyde and 52 parts of 2,2-dimethyl-3-hydroxypropanal are in the organic phase containing the major portion of the triethylamine and which is directly returnable). The total yield of 2,2-dimethyl-1,3-propanediolhydroxypivalic monoester and 2,2-dimethyl-3-hydroxypropanal (with reference to the total amount of isobutyraldehyde and formaldehyde) is equivalent to 84.1% of the theory.

EXAMPLE 2

A mixture of 810 parts of a 37% aqueous formaldehyde solution and 720 parts of isobutyraldehyde is heated to 50° C. under nitrogen. While stirring vigorously and under reflux cooling, 100 parts of triethylamine is run in during five minutes and the temperature is raised to 92° to 94° C. in the course of another ten to fifteen minutes. Triethylamine and water are distilled off within fifteen to twenty minutes at 150 to 30 mm. and a mixmum bottoms temperature of 70° to 75° C. over a column (diameter 3 cm.) packed with Raschig rings into an ice-cooled receiver followed by a receiver cooled with carbon dioxide. The mixture is then heated within fifteen to twenty minutes to 160° C. and while stirring vigorously 70 parts of water per hour is supplied during three hours at this temperature, and is distilled off again over a Raschig column. By fractional distillation of the reaction mixture over a packed column there is obtained in the boiling point range from 80° to 95° C. at 10 mm. 133 parts of a fraction containing 98 parts of 2,2-dimethyl-3-hydroxypropanal and, after an intermediate fraction of 29 parts, finally at from 129° to 131° C. at 2 mm., 733 parts of 2,2-dimethyl-1,3-propanediolhydroxypivalic monoester (melting point 50° to 51° C.), equivalent to 72% of the theory with reference to the starting materials isobutyraldehyde and formaldehyde.

The two-phase water/triethylamine distillate and the extract distilled off with steam are united. The mixture comprises 809 parts (of which 138 parts is the organic phase). Fractional distillation gives 16 parts of isobutyraldehyde and 68 parts of 2,2-dimethyl-3-hydroxypropanal, 12 parts of isobutyraldehyde and 45 parts of 2,2-dimethyl-3-hydroxypropanal being in the directly returnable organic phase. The total yield of 2,2-dimethyl-1,3-propanediolhydroxypivalic monoester and 2,2-dimethyl-3-hydroxypropanal, with reference to the isobutyraldehyde and formaldehyde, is equivalent to 88.1% of the theory.

EXAMPLE 3 (COMPARISON)

In the manner described in Example 2, 810 parts of a 37% aqueous formaldehyde solution and 720 parts of isobutyraldehyde are reacted in the presence of 100 parts of triethylamine, freed by distillation from water and free triethylamine and heated to 160° C. The reaction mixture is stirred for another three hours at this temperature without adding water and the reaction mixture is fractionated as described in Example 2. In the boiling point range from 80° to 95° C. at 10 mm., 139 parts of a fraction is obtained which contains 92 parts of 2,2-dimethyl and, after an intermediate fraction of 58 parts, finally at from 129° to 131° C. at 2 mm., 708 parts of 2,2-dimethyl-1,3 - propanediolhydroxypivalic monoester (melting point 50° to 51° C.) is obtained, equivalent to 69.4% of the theory with reference to the starting materials isobutyraldehyde and formaldehyde.

12 parts of isobutyraldehyde and 55 parts of 2,2-dimethyl-3-hydroxypropanal are contained in the water/triethylamine distillate (670 parts, of which 112 parts is organic phase). The total yield of 2,2-dimethyl-3-hydroxypropanal and 2,2-dimethyl-1,3-propanediolhydroxypivalic monoester is 83.8% of the theory with reference to isobutyraldehyde and formaldehyde.

What is claimed is:

1. A process for the production of 2,2-dimethyl-1,3-propanediolyhydroxypivalic monester from 2,2-dimethyl-3-hydroxypropanal prepared by reaction of formaldehyde with isobutyraldehyde at a temperature of from 20° to 100° C. in the presence of a tertiary amine wherein the reaction mixture obtained by reaction of formaldehyde with isobutyraldehyde, after free tertiary amine has been separated, is reacted at a temperature of from 120° to 175° C. in the presence of an organic salt of a tertiary amine having a molecular weight of less than 250.

2. A process as claimed in claim 1 wherein a gas or solvent vapor or a mixture of inert gas and solvent vapor which is inert under the reaction conditions is used to strip the reaction mixture during the reaction.

3. A process as claimed in claim 1 wherein the reaction is carried out at a temperature of from 140° to 165° C.

4. A process as claimed in claim 1 wherein the reaction is carried out in the presence of an aliphatic tertiary ammonium formate in an amount of from 0.08 to 0.25% molar with reference to 2,2-dimethyl-3-hydroxypropanal.

5. A process as claimed in claim 2 wherein the reaction is carried out with the inert gas or solvent vapor or a mixture of inert gas and solvent vapor in an amount of from 10 to 300% molar with reference to 1 mole of 2,2-dimethyl-3-hydroxypropanal in the reaction mixture.

6. A process as claimed in claim 2 wherein the reaction is carried out with the inert gas or solvent vapor or a mixture of inert gas and solvent vapor in an amount of from 40 to 150% molar with reference to each mole of 2,2-dimethyl-3-hydroxypropanal in the reaction mixture.

7. A process as claimed in claim 2 wherein the reaction is carried out with vapor of a solvent having a boiling point of less than 175° C.

8. A process as claimed in claim 2 wherein the reaction is carried out at from 30° to 135° C.

9. A process as claimed in claim 2 wherein the reaction is carried out with water as the solvent.

References Cited

UNITED STATES PATENTS 3,057,911  10/1962  Finch _____ 260—484 R
3,340,312   9/1967  Duke et al. _____ 260—602

LORRAINE A. WEINBERGER, Primary Examiner

P. J. KILLOS, Assistant Examiner

U.S. Cl. X.R.

260—602